United States Patent [19]

Ruzicka

[11] Patent Number: 5,785,276
[45] Date of Patent: Jul. 28, 1998

[54] ACTUATED ROLL AXIS AERIAL REFUELING BOOM

[75] Inventor: Dennis E. Ruzicka, Enumclaw, Wash.

[73] Assignee: The Boeing Company, Seattle, Wash.

[21] Appl. No.: 577,034

[22] Filed: Dec. 22, 1995

[51] Int. Cl.[6] .................................................. B64D 39/00
[52] U.S. Cl. .................................. 244/135 A; 244/135 R
[58] Field of Search ........................... 244/135 A, 135 R, 244/137 R, 136; 141/284, 387, 388

[56] References Cited

U.S. PATENT DOCUMENTS

| | | |
|---|---|---|
| 2,663,523 | 12/1953 | Leisy . |
| 2,670,913 | 3/1954 | Castor et al. . |
| 2,859,002 | 11/1958 | Leisy . |
| 2,949,265 | 8/1960 | Person .................. 244/135 A |
| 2,960,295 | 11/1960 | Schulze . |
| 4,072,283 | 2/1978 | Weiland . |
| 4,129,270 | 12/1978 | Robinson et al. . |
| 4,150,803 | 4/1979 | Fernandez . |
| 4,231,536 | 11/1980 | Ishimitsu et al. ............ 244/135 A |
| 4,422,366 | 12/1983 | Weyer . |
| 4,586,683 | 5/1986 | Kerker . |

Primary Examiner—Robert J. Oberleitner
Assistant Examiner—Tien Dinh
Attorney, Agent, or Firm—William C. Anderson

[57] ABSTRACT

An improvement in an airplane mounted aerial refueling boom wherein the boom assembly mounting permits motion about three axes. A first pivot attached to the fuselage of the airplane provides for radial or azimuth motion of the boom about a vertical or yaw axis of rotation essentially normal to the air stream. The second axis of motion, the pitch axis, is located below the airplane fuselage and perpendicular to the yaw axis so that the pitch axis rotates with any yaw motion of the boom and allows vertical displacement of the boom. Vertical and yaw displacement takes place in a conventional fashion. The third axis of motion, the roll axis, is located in-plane with and perpendicular to the pitch axis. This roll axis is coincident with the longitudinal centerline of the boom structural tube and a helical rotary actuator that produces a commanded roll motion as a function of pitch and yaw motion of the boom assembly. Rolling motion of the boom assembly serves to align the cross-sectional vertical chord axis of the boom and boom mounted aerodynamic surfaces with the local free stream air flow about the tanker airplane to minimize drag and optimize control authority.

20 Claims, 8 Drawing Sheets

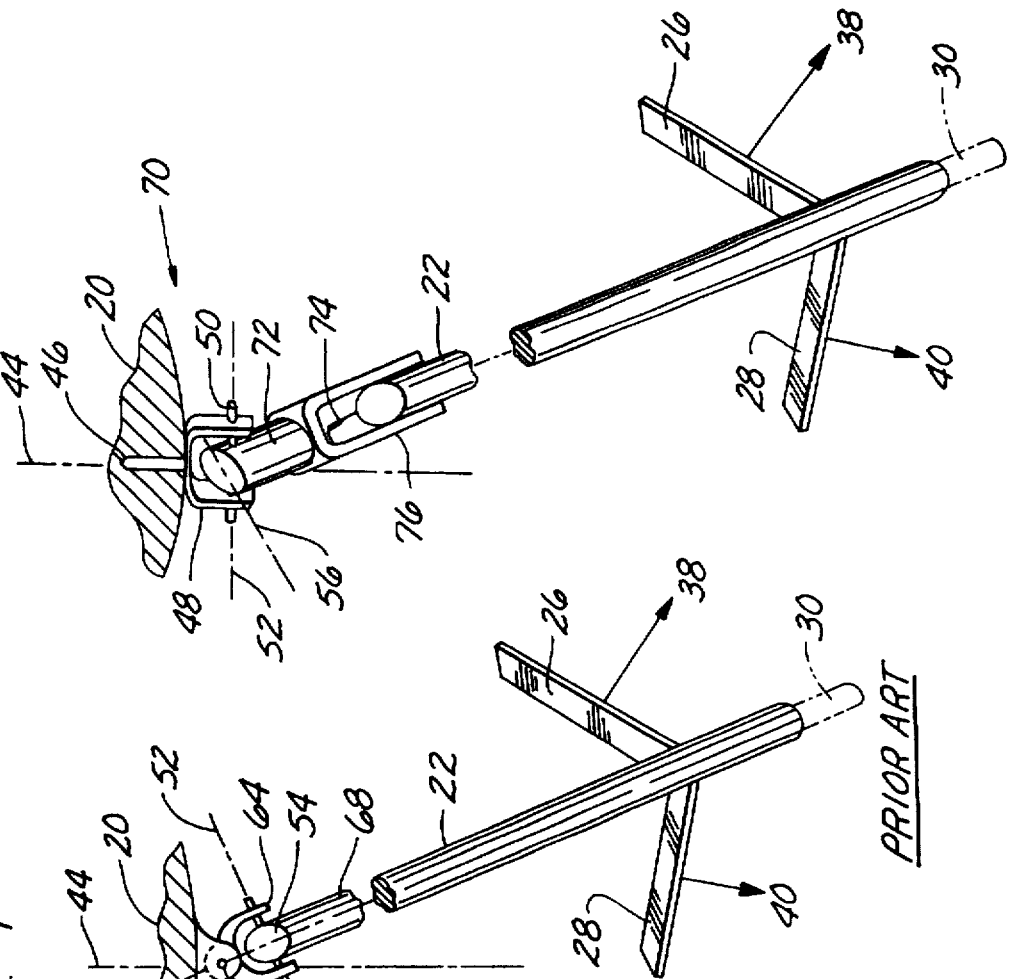

ACTUATED ROLL AXIS AERIAL REFUELING BOOM

TECHNICAL FIELD

This invention relates to an aerodynamically controlled telescoping aerial refueling boom assembly that is universally mounted to a tanker airplane for inflight transfer of fuel from the tanker airplane to a receiver airplane. Specifically, the present invention pertains to an improved boom mount assembly permitting increased aerodynamic motion and optimum control authority.

BACKGROUND OF THE INVENTION

Various systems are used to refuel one airplane (receiver) by another airplane (tanker) while both are in flight. For example, in one system a telescoping refueling boom extends downwardly and rearwardly from the tanker airplane towards the receiver airplane. The telescoping boom is universally mounted to the tanker airplane and may be aerodynamically controlled inside of a refueling envelope subtending a prismoidal volume. As long as a nozzle positioned at the terminus of the boom is located within the refueling envelope, the receiver airplane may be connected to the nozzle and fuel may be transferred from the tanker airplane to the receiver airplane. The boom mount assembly is an important determinant of the prismoidal volume limits and the degree to which the boom may be aerodynamically controlled during a refueling operation.

Examples of universal mounts previously used in the refueling booms contemplated above include the pivots of Castor et al. (U.S. Pat. No. 2,670,913, issued Mar. 2, 1954) and Schulze (U.S. Pat. No. 2,960,295, issued Nov. 15, 1960). Castor et al. and Schulze disclose a two-axis pivot means for attaching the boom to the tanker airplane wherein lateral or sideward displacement of the boom occurs about a vertical or yaw axis which is fixed relative to the airplane. This motion provides a true yawing boom in which the long side dimension of the boom is exposed to the local air stream resulting in large drag forces which resist the intended rotational displacement of the boom. The controlling means for moving the booms of Castor et al. and Schulze about these axes is a pair of aerodynamic surfaces, such as surfaces formed in a Vee and known as ruddevators. When the ruddevators are moved collectively to change their angle of attack relative to the local airstream, the boom will be moved upwardly or downwardly. A differential change in the angle of attack of the ruddevators will move the boom sidewardly or laterally.

Two Leisy patents (U.S. Pat. Nos. 2,663,523 and 2,859,002, issued Dec. 22, 1953, and Nov. 4, 1958, respectively) teach the use of a gimbal ring boom mounting wherein two mutually perpendicular axes of rotation lie in a single plane. Lateral or sideward displacement of the boom still occurs about a vertical axis. In the first Leisy patent a vertical vane or rudder is used to control lateral movement and elevators are used to move the boom upwardly and downwardly. In the second Leisy patent the boom is configured as a symmetrical aerodynamic section, i.e., a thick high aspect ratio wing. When twisted or rotated about its longitudinal center line or roll axis, the boom is deliberately disposed at an angle of attack to the relative air stream. The boom thus develops a sideward lift whereby a controlled lateral displacement of the boom about the vertical axis may be accomplished. As in the first Leisy patent, elevators are used to move the boom upwardly and downwardly.

The above boom systems have maneuvering deficiencies because the thick boom sections generate increased cross-flow drag and the aerodynamic control effectiveness of surfaces, such as ruddevators, is reduced significantly at large lateral or yaw deflections and high Mach numbers. These systems often use thick elliptical boom sections that provide some drag and airloads reduction when the major axis of the ellipse lays in the longitudinal plane of symmetry of the tanker airplane or the pitch plane of the boom. However, further streamlining of the boom section would increase the chord of the boom. Since lateral or yaw displacement of the boom occurs about a vertical axis, increasing the chord increases the total exposed area of the boom and therefore the already large aerodynamic drag forces which tend to resist the desired lateral displacement of the boom. As a consequence, the prismoidal volume in which the boom may be controlled is reduced. Furthermore, increasing the chord would increase an already turbulent airstream wake downstream of the yawed boom section and further limit or decrease the effectiveness of the aerodynamic control surfaces such as the ruddevators of Castor et al. and Schulze or the elevators of each Leisy patent.

In addition, lateral motion of the above boom systems do not permit the alignment of the aerodynamic control surfaces with the free airstream flowing proximate the tanker airplane. This alignment can minimize the boom profile exposed to the local airstream and thus the aerodynamic moment tending to resist yawing of the boom. Instead, as the boom rotates laterally from the plane of symmetry of the tanker airplane, the planform relationship of each control surface to that airstream is changed. A symmetric arrangement in one position becomes asymmetric in another as the control surfaces' geometry swings through the lateral displacement envelope. As a consequence, a control surface's spanwise lift distribution, stall characteristics, and finally the net lift force it can generate, to overcome the induced resistive airflow forces imposed on the boom within the refueling envelope, changes and is generally diminished.

These induced resistive airflow forces are the result of receiver airplane "bow wave effects" which are air mass disruptions caused by large shapes in proximity to the tanker airplane and the boom during the refueling operation formation flight sequences, plus the combination of these effects with the tanker airplane wake airflow and/or natural turbulence phenomena. Additionally, the control surface, which becomes located down wind of the laterally deflected boom assembly, has an increased level of turbulence due to the airflow wake shed from the local boom cross-section. This further degrades the control surface effectiveness and reduces the usable envelope, i.e., prismoidal volume, of refueling operations.

Many of these deficiencies are overcome in the roll type pivot of Kerker, U.S. Pat. No. 4,586,683, issued May 6, 1986. Kerker teaches a low drag aerial refueling boom which can be substantially aligned with the ambient air stream throughout the flight envelope. The upper end of the boom of Kerker is attached to a tanker airplane via a pair of support pivots which provide two axes of motion. The first support pivot is fixed to the tanker airplane and defines a first axis, or a roll axis, longitudinally oriented approximately parallel to the waterline of the tanker airplane. The first axis is also generally parallel to the air stream ambient to the tanker airplane. The second axis is horizontally oriented, perpendicular to and coupled to the first axis whereby the second axis and the boom may be rotated or rolled about the longitudinal first axis.

Vertical or pitch displacement of the Kerker boom occurs in a conventional manner about the second axis. However, since the pitch axis swings with the boom and is always rotated when the boom is in the deployed refueling envelope, rotation about the roll axis produces lateral displacement by scribing an arc about the roll axis. This feature contrasts with the two-axis pivots described in the Castor et al. and Schulze patents, and the gimbal mounts described in the first and second Leisy patents where lateral motion occurs about a vertical axis to produce a true yawing motion.

Since the roll axis is approximately parallel to the air stream, the thick elliptical shape boom cross section of Kerker always presents its leading edge to the ambient airflow regardless of the roll deflection required to position the nozzle laterally. Thus, the rolling boom develops minimal lateral air loads and allows lower drag boom sections within close chord-length constraints since the angle of attack range is very small. As a consequence, this type of boom mount makes the use of smaller and more efficient control vanes possible.

One deficiency of the Kerker boom mounting system occurs when the boom longitudinal axis is nearly parallel with the roll axis, e.g., in a nearly horizontal position. In this position boom stability is more sensitive to the wake turbulence of the tanker airplane. To ensure adequate stability prior to stowage or full deployment, a mechanized installation comprising control arms, stops, and bungees is employed. This installation applies a restoring, or biasing, force to the pivot trunion as the boom is rotated between stowed and deployed positions.

SUMMARY OF THE INVENTION

An objective of this invention is to provide an improved aerial refueling boom assembly mount, and the means for controlling and positioning the boom.

Another object of the present invention is to provide an aerial refueling boom mounting that provides three degrees of motion for accurate position placement and free airstream alignment of the boom and aerodynamic control surfaces.

A further object of this invention is to provide an aerial refueling boom that has aerodynamic control surfaces of a minimum size that produce balanced lift forces regardless of boom lateral position and induced aerodynamic environment.

In accordance with the present invention, a low drag aerial refueling telescoping boom, preferably having an elliptical cross section, may be accurately aligned with the ambient air stream throughout the flight envelope. The boom upper end is attached to the tanker airplane via a boom mount assembly which permits three axes of motion.

The boom mount of the present invention comprises a first pin, defining a first or a yaw axis, which is pivotably fixed to the tanker airplane. The first axis is essentially vertically oriented, i.e., approximately normal to the tanker airplane waterline and the air stream flowing about the airplane. A second or a pitch axis, defined by a yoke, is horizontally oriented, perpendicular to and coupled to the first axis so that it rotates with the boom about the vertical first axis. Vertical or pitch displacement occurs in a conventional fashion about the second axis.

The third axis of motion is defined by a rotary actuator that coincides with the boom longitudinal axis and is in plane with and orthogonal to the second axis. Since the third axis is rotated with the boom and is always deflected when the boom is in the refueling envelope, programmed rotation about this third axis can align the boom with the ambient air stream as a function of pitch and yaw position of the boom.

Since the boom cross-section axis is always accurately aligned to the air stream, the boom cross-section, which is faired to substantially elliptical or a thick airfoil shape for reduced drag, always presents its leading edge to the airflow, i.e., substantially zero angle of attack. This is true regardless of the yaw deflection required to position the nozzle laterally. Thus, the actuated roll axis boom of the present invention develops minimal lateral air loads, allows lower drag boom sections within close chord-length constraints since the angle of attack range is negligible, and permits smaller and more efficient control vanes.

BRIEF DESCRIPTION OF THE DRAWINGS

The foregoing and other features and advantages of the present invention will become more readily appreciated as the same becomes better understood by reference to the following detailed description of an embodiment of the invention and the accompanying drawings wherein like numbers refer to the same or similar parts and wherein:

FIG. 3 is a simplified view looking aft under the lower surface of the tanker airplane of FIG. I at a deployed boom frontal view of a known yaw type boom support and pivot capable of two degrees of motion.

FIG. 4 is a view similar to that shown in FIG. 3 and shows a known roll type boom support and pivot capable of two degrees of motion.

FIG. 5 is a view similar to that shown in FIG. 3 showing the present invention for a boom support and pivot mount having three degrees of motion.

DETAILED DESCRIPTION OF THE PREFERRED EMBODIMENT

Figure 1:
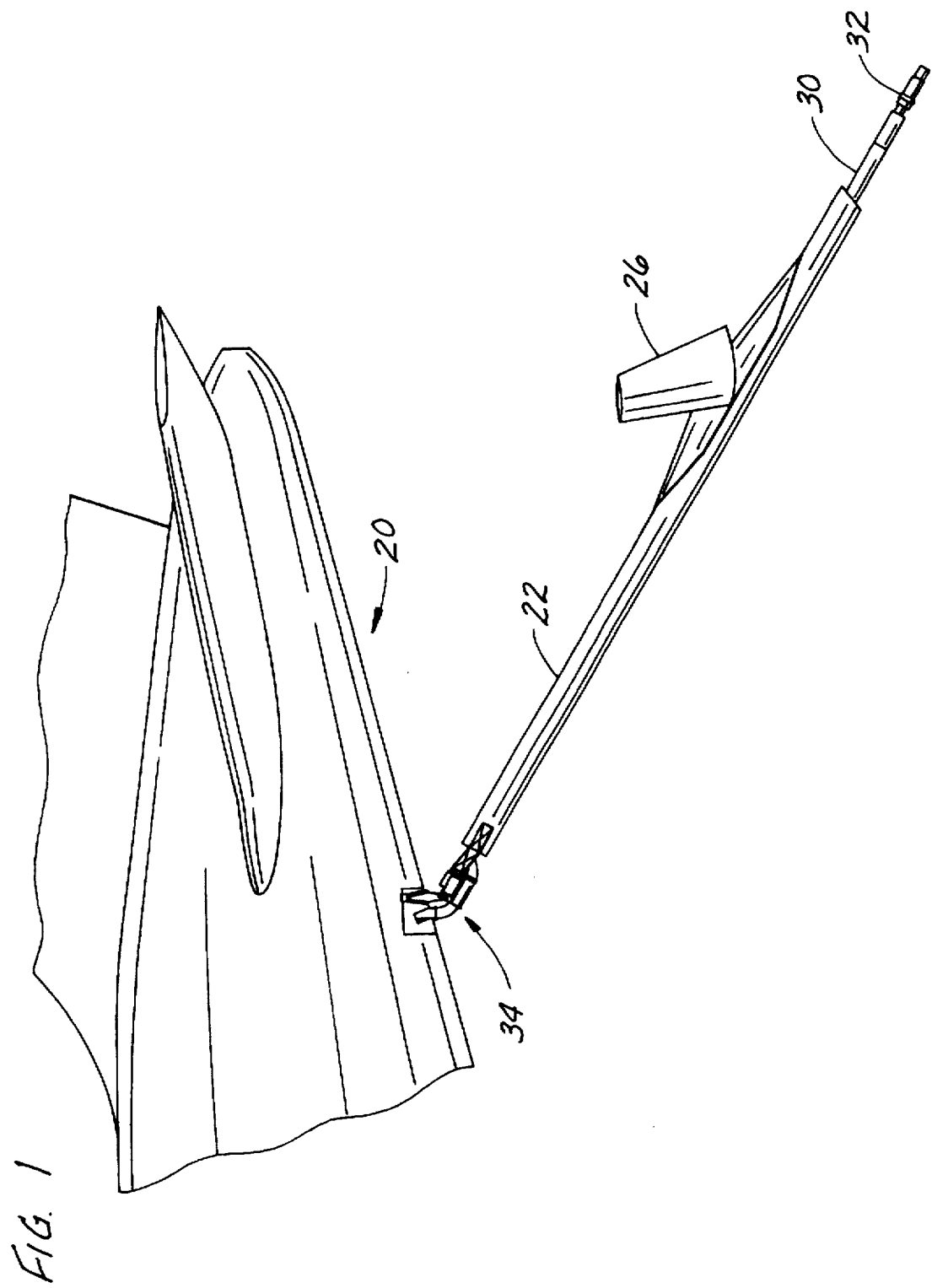
FIG. 1 is a side view of the aft end of a tanker airplane tail section showing the principal elements of an aerial refueling boom of the present invention a nominally deployed position.

FIG. 1 is a pictorial diagram illustrating the aft end of a tanker airplane 20. The tanker airplane is provided with a telescoping aerial refueling boom 22 shown extending generally downwardly and rearwardly of the tanker airplane 20 within a refueling envelope, e.g., within a nominal refueling contact envelope 24 or an outer refueling envelope limit 36 (see FIG. 2). Integrally attached to each side of boom 22 is an inclined lift surface called a ruddevator 26, 28, each of which operates as an aerodynamic control effector. The ruddevators 26, 28 are used in a well known manner to generate lift forces that move the boom 22 in pitch or elevation (upwardly or downwardly relative to the waterline of the airplane 20) and yaw or azimuth (laterally with respect to the longitudinal plane of symmetry of the airplane) to achieve and maintain desired positions anywhere in the theoretical control volume limit represented by 82 (see FIG. 2).

The outer tubular end portion 30 of the boom 22 is a telescoping section for changing boom length by inward and outward movement. Located on the distal end of the telescoping tube 30 is a nozzle 32. A receiver airplane, not shown, is equipped with an aerial refueling receptacle (not shown) which engages with or couples to the nozzle 32 during a refueling operation. The coupling action permits valves (not shown) in the nozzle 32 and the receiver airplane receptacle to open so that fuel supplied under pressure by the tanker airplane 20 can flow to the receiver airplane.

Boom motion is determined by a boom mount or mounting assembly 34, which will be explained in detail later. A boom operator, not shown, is located in the tanker airplane 20 in a position to observe the receiver airplane. The boom operator guides the boom 20 so as to align the boom nozzle 32 with the receiver airplane receptacle. When the boom nozzle 32 is dynamically aligned with the receiver receptacle, the boom operator extends the telescoping portion 30 of the boom 22 so that the nozzle 32 engages the receptacle to complete the coupling. This coupling must be accomplished within the contact envelope 24 and maintained within refueling envelope 36 (see FIG. 2) to avoid a disconnect.

A boom mounting assembly has a dramatic effect on boom motion and orientation of its ruddevators or control vanes. FIGS. 3 & 4 show conventional mounts, and FIG. 5 illustrates the improved boom mounting assembly of the present invention. In each case, the view looks aft at a deployed boom 22 shown rotated or deflected to the low outboard region of its nominal refueling or displacement envelope. The arrows 38, 40 shown projecting from the control vanes 26, 28, respectively, are vector forces which qualitatively represent the relative magnitudes of the vane lift forces available to hold the boom 22 in the desired deflected position shown.

FIG. 3 shows a conventional yaw type boom pivot mount assembly 42 typical of Castor et al. and Schulze having a vertical or yaw axis 44, about which a first pivot pin 46 rotates to provide lateral or sideways rotational movement of the boom 22. The pivot pin 46 is rotatably fixed to appropriate structure of the tanker airplane 20. A yoke 48 is attached to the first pivot pin 46 and supports a second pivot pin 50 which defines a pitch axis 52. The second pivot pin 50 secures the boom 22 to the yoke 48. Attached to the rear portion of boom 22 is a pair of ruddevators 26, 28. The ruddevators 26, 28 perform the function of both rudder for yaw motion and elevator for pitch motion.

As shown in FIG. 3, the boom 22 has an elliptical cross section 54. The oblique view of the elliptical boom section 54 in FIG. 2 indicates the degree to which the boom 22 has been deflected/yawed toward an outboard side. In this orientation, the side or chordwise dimension of the boom is largely exposed to the local air flow and increases drag because the long side dimension and chord length present greater area to the airstream. The chord axis (vertical dimension) 56 of the boom cross section 54, which minimizes the drag at zero yaw, is detrimental at large yaw angles when it is presented to the airstream in the long side dimension of boom 22 as an oblique plane. This is true of any kind of fixed fairing on a yawing boom and severely restricts streamlining opportunities as was explained above.

Inefficient control vane operation is indicated by the great difference in available vane airloads as shown by the length of the arrows at 38 and 40. Induced drag on the ruddevators 26, 28, resulting from the required surface position to generate lift and effect boom motion or retain a trimmed condition, adds to the deflected/yawed boom drag moments. Additional down-load or deflection of the ruddevator 26, 28 is therefore required to maintain trim of the boom 22.

FIG. 4 is a schematic representation illustrating a roll type boom mounting arrangement 58 of the Kerker aerial refueling system. This mounting arrangement comprises a first axis of rotation or roll axis (perpendicular to the plane of FIG. 4) for the boom 22 and extends longitudinally and parallel to the waterline of the airplane 20. This longitudinal axis is defined by a first or roll pivot pin 60 supported by a clevis 62 fixed to the fuselage of the tanker airplane 20. Ideally, this first axis of rotation is exactly parallel to the airstream proximate the tanker airplane 20. However, moderate skewing of this roll axis is necessary to enhance boom stability characteristics. The clevis 62 rotatably supports a yoke 64 via the roll pivot pin 60. The yoke 64 in turn supports the boom 22 via a second or pitch pivot pin 66 which defines the pitch axis 52.

The pitch pin 66 rolls or swings with the boom 22 about the longitudinal axis defined by the roll pin 60. As a result the elliptical boom cross-section 54 always presents its leading edge to the air flow, regardless of the roll deflection required to position the boom 22 laterally. As should be obvious, the boom longitudinal section chord plane always contains the roll axis defined by the roll pin 60 and therefore the boom section angle of attack to the air stream is always small.

The relative air loads 40 and 42 generated by the ruddevators 26, 28 are nearly symmetrical due to rolling alignment of the boom 22 and ruddevators with the air stream. The small difference in air load distribution is used as the lateral or outward force required to overcome the boom weight component and swing the boom 22 sideways.

As mentioned above, one deficiency of the Kerker boom mounting system 58 occurs when the boom longitudinal axis 68 is nearly parallel with the roll axis defined by the pin 60, e.g., in a nearly horizontal position. In this position boom stability is more sensitive to the wake turbulence of the tanker airplane 20. To ensure adequate stability prior to stowage or full deployment, a mechanized installation (not shown) comprising control arms, stops, and bungees is employed. This installation applies a restoring, or biasing, force to the yoke 64 as the boom 22 is rotated between stowed and deployed positions.

FIG. 5 is a schematic representation illustrating the arrangement of an aerial refueling system embodying the boom mount assembly of the present invention. In particular, the improved boom mount assembly 70 comprises a first axis or a yaw pivot pin 46 defining the vertical axis 44. The pivot pin 46 is rotatably fixed to appropriate structure of the tanker airplane 20. A yoke 48 supports a second pivot pin 50, defining the pitch axis 52, to which is attached a rotary actuator 72, such as a hydraulically powered helical rotary actuator. The output shaft and centerline of the helical rotary actuator 72 (not shown) coincides with and defines a boom roll axis 74. The actuator output shaft is connected to the boom 22 via a connecting yoke 76.

Hydraulically powered rotary actuators of the type contemplated herein are well known. For example, the hydraulically powered helical rotary actuator disclosed in U.S. Pat. No. 4,422,366, issued Dec. 27, 1983, to Weyer may be useful in connection with the present invention. As described in Weyer, rotational output of the rotary actuator 72 is produced by internal gearing in accordance with direction signals commanding either clockwise or anticlockwise rotation. That clockwise or anti-clockwise rotation is dependent on either the left or right yaw motions of the boom 22, respectively.

In contrast with the mounting assembly of FIG. 3, the roll axis 74 is coincident with the longitudinal center of the rotary actuator 72 and the boom 22. As will be explained in greater detail hereinafter, upon commanded pitch and yaw motion from an operator (not shown), the rotary actuator 72 generates a certain amount of rotation about the roll axis 74 that is dependent upon the angular amount of lateral and vertical displacement of the boom 22 (see FIGS. 2 and 6). For any angular pitch and yaw position that the boom 22 can be directed to by use of the ruddevators 26, 28, the helical rotary actuator 72 can rotate the boom 22. As a result, the helical rotary actuator 72 can precisely align the chord plane (vertical dimension) of the boom and the trimmed leading edge or chord plane of the ruddevators with the free stream air flow at any position within one or more control envelopes.

Figure 6:
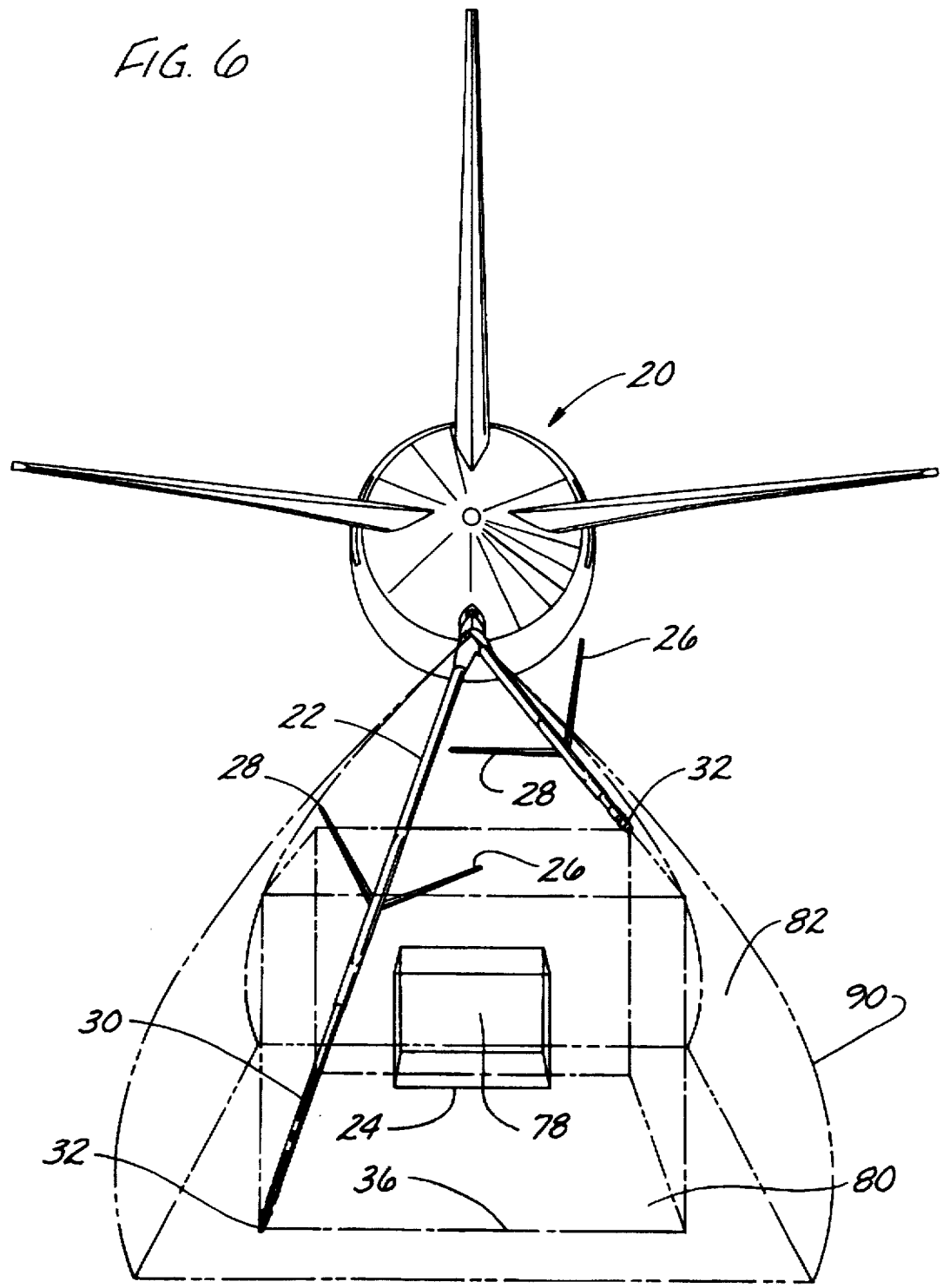
FIG. 6 illustrates a rear view looking forward towards the tanker airplane aft end with the refueling boom deployed at the extreme corners of the refueling envelope.

As best shown in FIG. 6, the boom mount assembly 70 of the present invention permits a wide range of movement of the boom 22, i.e., sidewardly, downwardly, and forward and back to accommodate the relative position of a receiver airplane. Tracing the extremities of these movements define one or more prismoidal volumes 78, 80 and 82. The volume 78 relates to the nominal contact envelope where the nozzle 32 preferably contacts a receptacle on the receiver airplane. The nozzle will normally be withdrawn if the motion of the boom 22 causes the nozzle to approach the boundary of the nominal refueling envelope 80, i.e., the so-called auto disconnect envelope. As will be seen, the auto disconnect envelope afforded by the present invention is equal to or greater than the auto disconnect envelope obtainable with the Kerker mounting assembly 58. Further, the present invention exhibits the capability of achieving the theoretical control volume limit represented by 82.

The unobvious combination of the rotary actuator 72 and the two axis mounting assembly of FIG. 3 results in a number of advantages. For example, aerodynamic drag is minimized because of the substantial alignment of the elliptical boom cross section chord plane to the local airstream. Further, the air loads 38 and 40 that can be generated by the ruddevators 26, 28 can be made substantially balanced. In addition, that balance of air load can be optimized as compared to the mounting assembly of FIG. 3. Finally, the present mounting assembly achieves equivalent or better flight performance to that described for the Kerker mount of FIG. 4, as will be better understood.

Figure 2:
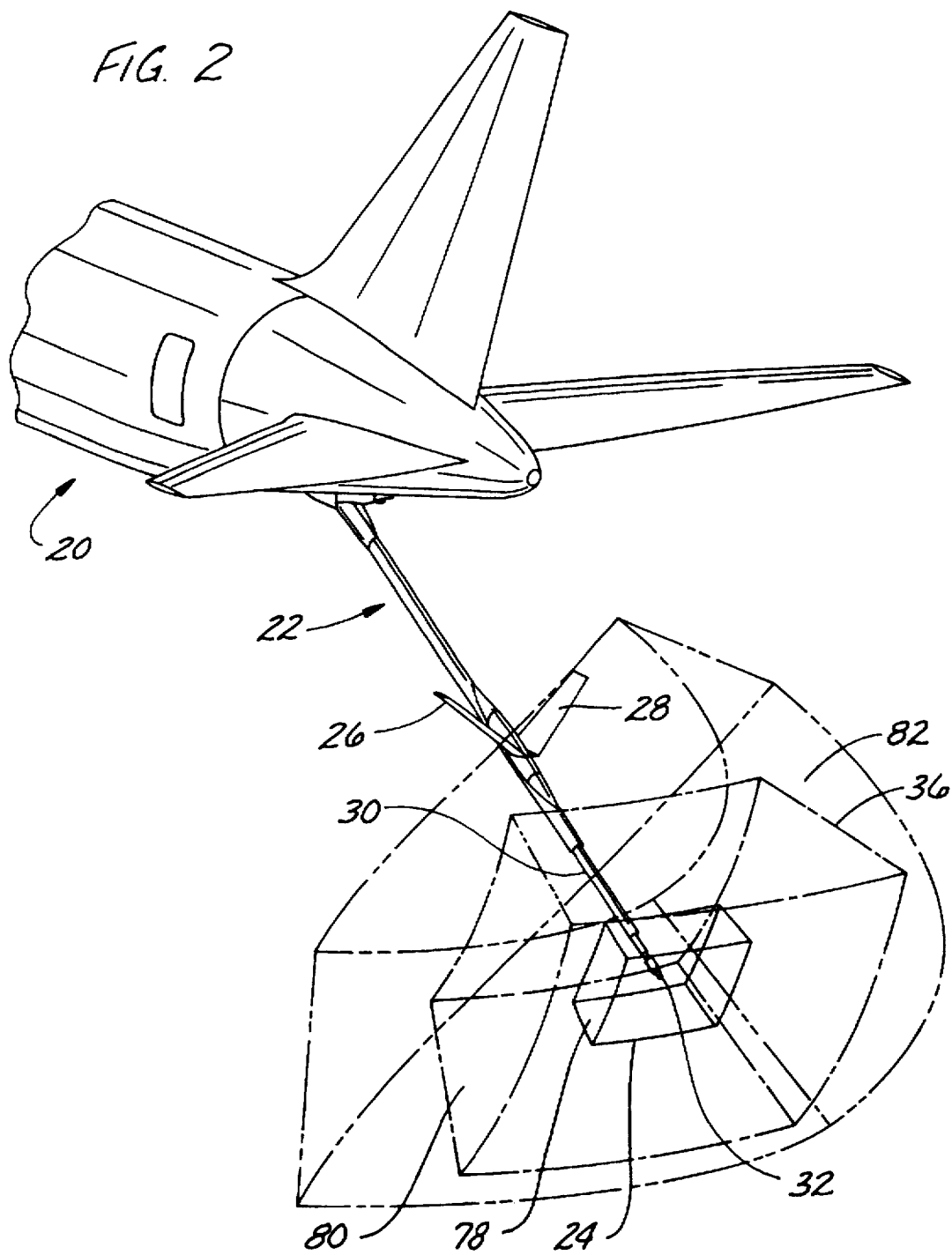
FIG. 2 is a rear isometric view of the aft end of the tanker airplane of FIG. 1 showing an aerial refueling boom of the present invention in the nominally deployed position and the various operating envelopes in which the present boom ma be controlled.
Figure 7:
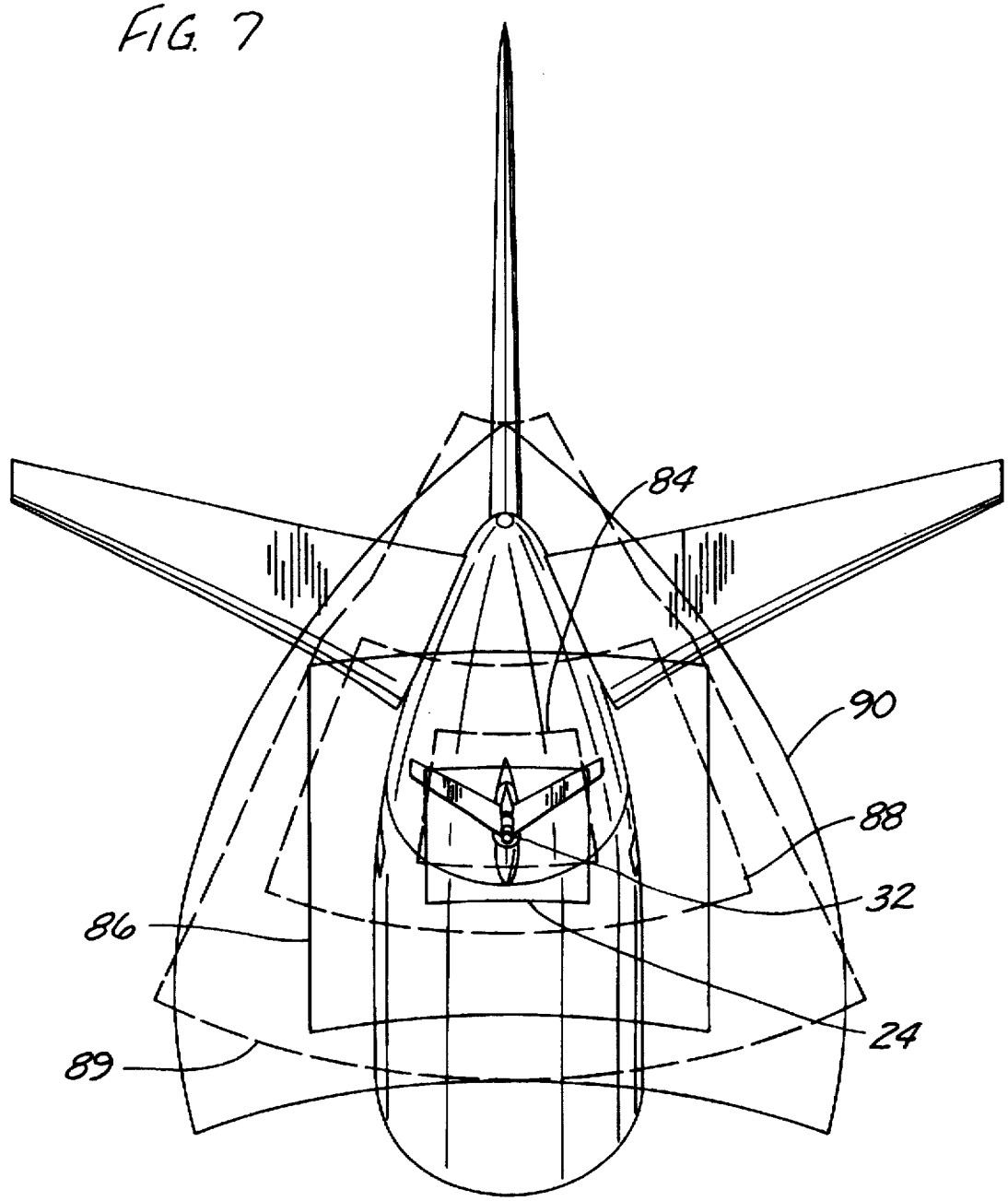
FIG. 7 provides a comparison of the control envelopes of the present invention with the known roll type boom support and pivot capable of two degrees of motion

FIG. 7, represents a comparison of projected envelope boundaries, traceable by a boom of the present invention and a Kerker boom, on a plane normal to the nominal contact position of the nozzle 32 shown in FIG. 2. For example, the boundary 24, indicated by solid lines, representing the nominal refueling envelope of the present invention, indicates the prismoidal volume 78 at the nozzle 32. The boundary 84, shown by dashed lines, indicates the nominal refueling prismoidal volume traceable with the Kerker boom. The boundary 86, shown as a solid line, indicates the prismoidal volume of nominal refueling envelope 80 of the present invention. The boundary 88, indicated by dashed lines, indicates the auto disconnect prismoidal volume traceable with the Kerker boom. Finally, boundaries 89, 90, shown by solid and dashed lines, indicates the theoretical control volume limits of the present invention and that of the Kerker boom, respectively.

Figure 8:
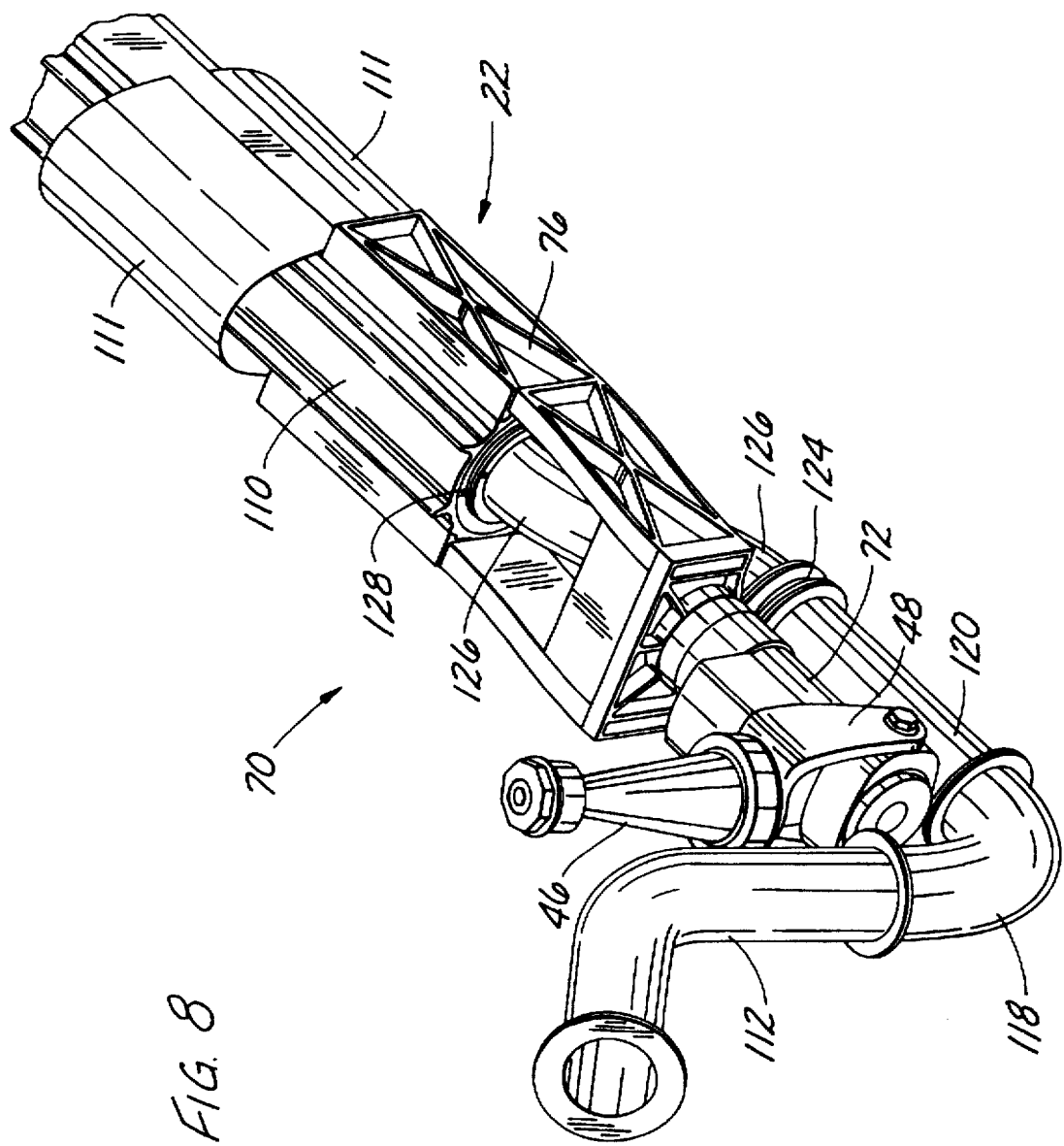
FIG. 8 is an isometric view of the boom mounting assembly of the present invention at a nominally stowed position.
Figure 9:
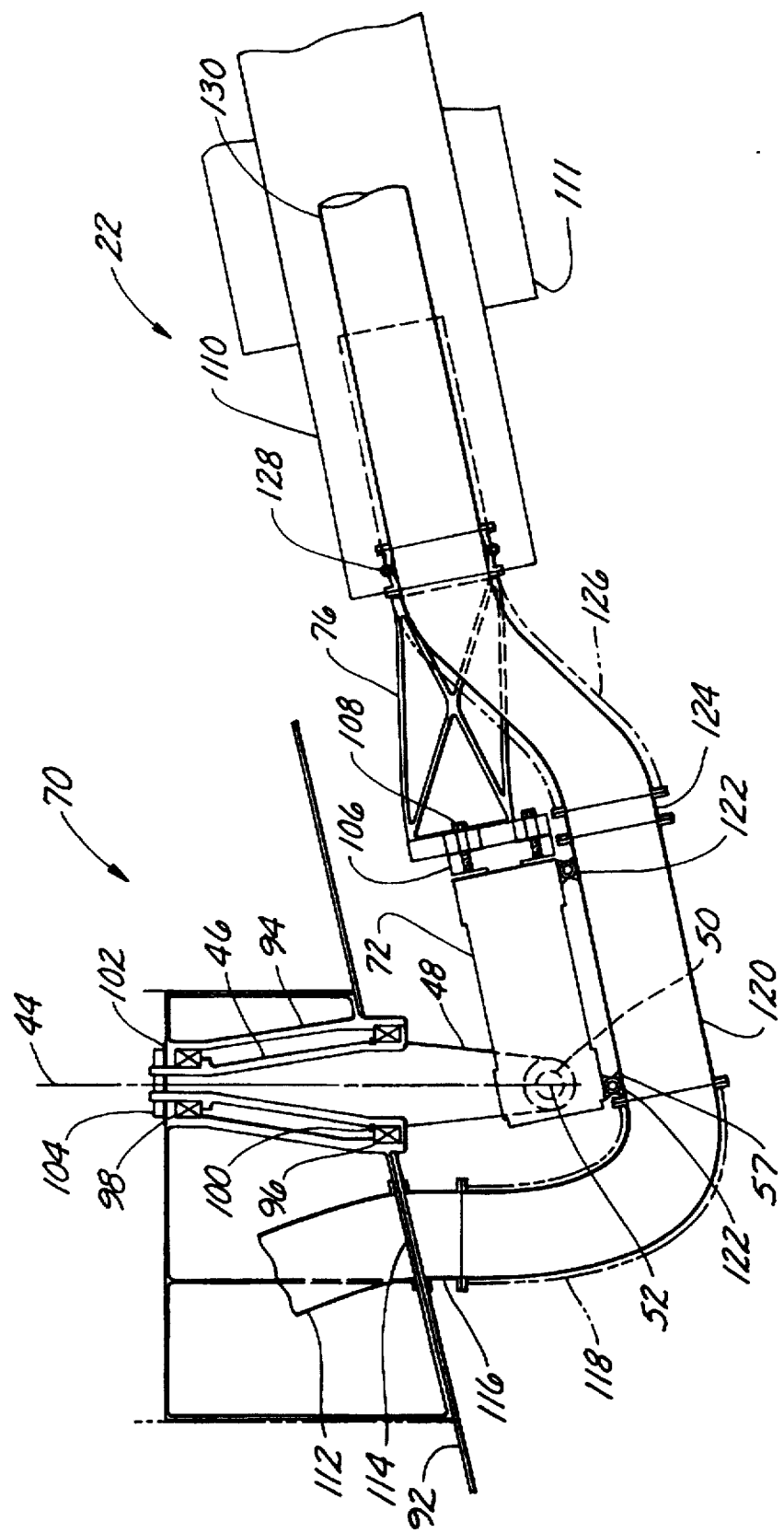
FIG. 9 shows side view details of the present invention at the nominally stowed position.
Figure 10:
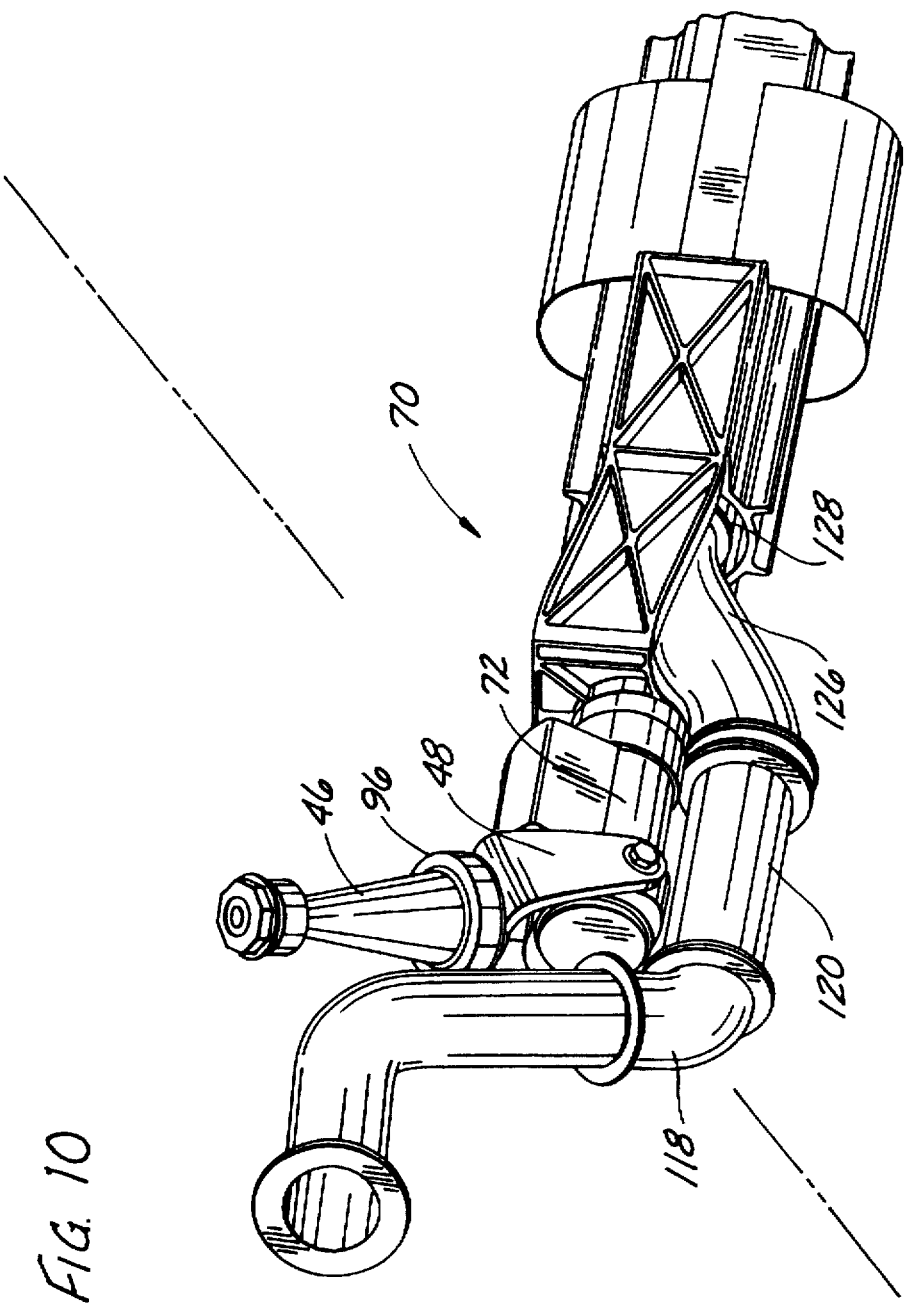
FIG. 10 is an isometric view of the present invention showing the boom mounting assembly rotated laterally and downwardly and illustrating a roll of the boom to optimally align the boom relative to the local air flow.

FIGS. 8, 9, and 10 show the details of the principal elements and general arrangement of the three axis boom pivot mounting assembly of the present invention. FIGS. 8 and 9 show the boom 22 in a position where the boom is stowed proximate to the tanker airplane 20. FIG. 10 shows the boom in a deployed position wherein the boom elliptical cross section or chord plane is aligned with the ambient airstream.

As best seen in FIG. 9, the improved boom mounting assembly 70 of the present invention is pivotably attached to the tanker airplane structure 92 by means of a pivot support fitting 94. The yaw axis pin 46 mounts a lower bearing 96 with a retainer 100 and an upper bearing 98. The yaw axis pin 46 is rotatably secured within the pivot support fitting 94 at the upper bearing 98 end by means of a washer 102 and a nut 104, respectively. As described earlier, the first pivot pin 46 is coupled to the yoke 48 which journally supports the second pivot pin 50. The helical rotary actuator 72 is linked to the yoke 48 by means of the pin 50 which forms the pitch axis 52. As should be clear, the pitch axis 52 is perpendicular to the plane of boom 22 symmetry and the pivot pin 46 yaw axis 44.

The rotary actuator 72 output motion occurs at a flange and splined shaft end 106 which assembles and is coupled to the connecting yoke 76 by means of bolts 108. The connecting yoke 76 is suitably affixed to the boom structural beam 110 which is contained within a fairing 111 having an elliptical external cross sectional configuration. Upon receipt of a suitable command from an operator, rotational output motion of the rotary actuator 72 gear train (not shown) is transmitted to the boom structural beam 110 via the connecting yoke 76.

The tanker airplane 20 has an aerial refueling boom fuel supply manifold 112 that mates with a penetration 114 in the fuselage of the airplane 20 and a flanged connector 116 (see FIG. 9). A flexible bellows 118 ties the flanged connector 116 to a rigid fuel tube 120 and permits pitch and yaw motion between the relatively fixed airplane 20 and the highly maneuverable boom 22. The rigid fuel tube 120 is supported by the helical rotary actuator 72 using any appropriate means 122.

The rigid fuel tube 120 is coupled to a flanged connector 124 and a second flexible bellows 126. The flexible bellows 126 is rotatably coupled to a roll swivel connector 128 that is in turn connected to a fixed fuel line 130 within the boom 22. The flexible bellows 126 and the roll swivel connector 128 permit a rolling motion between the fixed rigid fuel tube 120 and the movable boom 22. The flexible bellows 118 retracts as the boom 22 moves from the nominal stowed position (see FIG. 9) downwardly and laterally to the deployed position shown in FIG. 10. The bellows 118 extends as the boom 22 moves back to a stowed position.

Upon release from the stowed position, the boom 22 is typically rotated down to a horizontal position (not shown) wherein the control surfaces of ruddevators 26, 28 become fully effective in providing movement of the boom about the vertical axis 44 and the pitch axis 52. Sensors (not shown) detect the direction and rate of motion of the boom 22 about the vertical axis 44 and the pitch axis 52. This sensed positional data is transmitted to a computer (not shown) that is part of a boom flight control system (not shown). The boom positional data is processed by the computer, in accordance with the following algorithm:

$$\Theta_r = \tan^{-1}(\sin\Theta_y/\cos\Theta_y \sin\Theta_p)$$

Where:
$\Theta_r$=boom roll
$\Theta_y$=boom yaw/azimuth
$\Theta_p$=boom pitch/elevation This algorithm is used to determine the boom roll position (rotation and direction) required to align the cross section major axis or chord plane of the boom 22 with the local or free stream airflow. Free stream airflow direction can be determined in a conventional manner by processing tanker airplane flight data in the boom flight control system.

Elevation or azimuth maneuvering of the boom 22 takes place about the pitch axis 52 and yaw axis 44, respectively. The free stream alignment may be accomplished by rolling the boom 22 using the rotary actuator 72 in accordance with electronic signals sent from the boom flight control system to hydraulic flow control valves (not shown). The valves control the helical rotary actuator 72 which produces the desired boom roll position. This roll positioning motion can be effected about axis 74 (see FIG. 5) throughout the full maneuvering envelopes or prismodial volumes of boom 22, i.e. up to prismoidal volume 82 established by the maximum roll angle limit achievable by the helical rotary actuator 72 in either a clockwise or anti-clockwise direction.

To achieve and maintain optimum boom positioning within the control envelopes 24, 36, the relative net airloads 38, 40 (see FIG. 5) may be sensed and used to refine the initial programmed roll positioning of the boom 22 by the rotary actuator 72. Conventional sensors (not shown) could be used to detect the magnitude and direction of each ruddevator net airload. This sensed relative net airloads data would be transmitted to and processed by the boom flight control system computer using the algorithm set that controls the angle of attack positioning of each ruddevator as a function of conventionally derived control laws describing the boom 22 and ruddevators 26, 28 aerodynamic and stability characteristics in conjunction the boom roll position algorithm previously described. Iterative computer processing would determine the ruddevator angle of attack or incremental boom roll angle and rotation direction required to cause the difference in net airload of the ruddevators 26, 28, or nozzle induced radial load caused by relative motion sensed by nozzle load sensors (not shown) when the nozzle is in contact with a receiver airplane receptacle, to approach zero. An adjustment in alignment of the boom chord plane and ruddevator airload balance could be effected by sending a signal to ruddevator actuators (not shown) and/or the helical rotary actuator 72, whereby the boom 22 and ruddevators 26 or 28 may be retrimmed for a more optimum balanced load and minimum drag condition.

In accordance with the present invention, a refueling boom may be rotated about the third or roll axis from a position of zero rotation when the boom plane of symmetry is coincident at the plane of symmetry of a supply airplane and the boom is disposed at a horizontal position, to a maximum of 45 degrees rotation about the third or roll axis when the boom is moved from the horizontal position to a fully deployed position of 50 degrees below horizontal with simultaneous movement in azimuth position to either side of the plane of symmetry of the supply airplane.

The present invention thus provides significantly greater safety, precise control authority, and boom operational refueling envelope capability when compared to the true yawing booms of the prior art and equals or exceeds the capability of rolling pivot booms. These advantages are achieved by employing a rotary actuator and the algorithmic control described herein to accurately match boom alignment with local airflow free stream conditions behind a tanker airplane including the influence of large receiver bow wave effects.

This invention has been generally described as being applicable to an aerodynamically controlled, universally mounted, telescoping refueling boom for transferring fuel in flight from a tanker airplane to a receiver airplane. However, the present invention would apply equally to any similarly deployed boom or strut for any other purpose. It should therefore be understood that the embodiment described is merely illustrative as there are numerous variations and modifications which may be made by those skilled in the art. Thus, the invention is to be construed as being limited only by the spirit and scope of the appended claims.

What is claimed and desired to be secured by Letters Patent of the United States is:

1. A maneuverable apparatus for interconnecting a fuel supply airplane with a trailing receiver airplane during high speed in-flight fuel transfer, said apparatus comprising:

(a) first pivot means mounted to said supply airplane to provide angular motion about a first axis of rotation oriented essentially normal to the line of flight of said supply airplane at the time of maneuvering said apparatus;

(b) second pivot means attached to and rotating with said first pivot means to permit angular motion in a generally vertical plane about a second axis of rotation perpendicular to said first axis;

(c) third pivot means attached to said second pivot means for producing rotation about a third axis, said third means being aligned along said third axis, said third axis being orthogonal to said second axis;

(d) a boom extending generally aft from said first pivot, said boom being rotatable about its longitudinal axis by said third pivot means, said third pivot means comprising a rotary actuator having an output shaft, said output shaft having its longitudinal and rotational axis aligned with said third axis, said actuator being fixedly attached to said second pivot means and said boom, whereby when a commanded motion relating to rotational output direction and value about said first and said second axis is furnished to said rotary actuator, said rotary actuator produces a corresponding rotation of said boom about said third axis, and (e) wherein said boom has a substantially elliptical cross-section having a major axis whereby when said boom is rotated about said third axis by said rotary actuator, said major axis is substantially aligned with the local free airstream surrounding said supply airplane.

2. The apparatus as recited in claim 1, further comprising control surfaces mounted upon said boom, said control surfaces being rotatable both asymmetrically and symmetrically into the local airflow to generate a net aerodynamic lift resulting in a moment about both said first pivot axis and said second pivot axis, whereby said boom may be moved in an azimuth and elevation direction simultaneously.

3. The apparatus as recited in claim 2, wherein said rotary actuator produces a simultaneous rotation of said boom along said third axis as said control surfaces produce moments about both said first pivot axis and said second pivot axis simultaneously.

4. The apparatus as recited in claim 3, wherein said commanded motion to said rotary actuator is determined by said boom azimuth and elevation position.

5. The apparatus as recited in claim 4, wherein said boom has a faired aerodynamic cross-section that may be maintained in an essentially zero angle of attack with said local air stream with negligible aerodynamic forces induced by said local air stream.

6. The apparatus as recited in claim 5, wherein said boom is rotated about said third axis of rotation, said control surfaces are substantially aligned with said local airstream and an essentially zero angle of attack is maintained, whereby said control surfaces have to produce relatively small aerodynamic forces to maintain said boom in a desired position relative to said first pivot means and said second pivot means.

7. The apparatus as recited claim 1, wherein said first and second pivot means axes are coplanar.

8. The apparatus as recited in claim 7, wherein said boom may be rotated about said second pivot means from a stowed position above horizontal to a fully deployed position 50 degrees below horizontal.

9. The apparatus as recited in claim 1, wherein said second and third pivot means axes are coplanar.

10. The apparatus as recited in claim 9, wherein said boom may be rotated about said third axis from a position of zero rotation when said boom plane of symmetry is coincident at the plane of symmetry of said supply airplane and the boom is disposed at a horizontal position, to a maximum of 45 degrees rotation about said third axis when said boom is moved from the horizontal position to a fully deployed position of 50 degrees below horizontal with simultaneous movement in azimuth position to either side of the plane of symmetry of said supply airplane.

11. The apparatus as recited in claim 1, wherein said boom has a substantially elliptic cross-sectional shape when viewed on a vertical plane that is orthogonal to the longitudinal plane of symmetry of said boom.

12. The apparatus as recited in claim 11, wherein said boom may be rotated by said rotary actuator to vertically orient the major axis of said elliptical cross-section of said boom within the plane of symmetry of said supply airplane.

13. The apparatus as recited in claim 1, wherein said first pivot means and said second pivot means comprises a shaft and a first clevised yoke, said shaft being attached to said first clevised yoke, said shaft being attached to said supply airplane, said shaft being supported within journaled bearings supported by said supply airplane, said first axis being oriented essentially normal to the line of flight of said supply airplane and on the plane of symmetry of said supply airplane at the time of maneuvering said apparatus.

14. The apparatus as recited in claim 13, wherein said first clevised yoke defines said second axis, said first clevised yoke supporting a pivot pin, said pivot pin being coupled to said rotary actuator.

15. The apparatus as recited in claim 14, wherein said rotary actuator is provided with a rotational shaft, said rotational shaft being coupled to a second clevised yoke, said second clevised yoke being connected to said boom.

16. The apparatus as recited in claim 14, wherein one end of said rotary actuator is fixedly attached to said first clevised yoke and the opposite end of said rotary actuator is fixedly attached to said boom.

17. An actuated roll axis aerial refueling system for fluidly interconnecting a fuel supply airplane with a trailing receiver airplane during high speed in-flight fuel transfer, said system comprising:

(a) first means mounted to said supply airplane for providing angular motion about a first axis of rotation oriented essentially normal to the line of flight of said supply airplane;

(b) second means attached to and rotatable with said first means for providing angular motion in a generally vertical plane about a second axis of rotation perpendicular to said first axis;

(c) means providing a refueling boom extending generally aft along said supply airplane from said first means and disposed orthogonally to said second axis, said boom means having a substantially elliptical cross section with a chord plane;

(d) aerodynamic means for effecting angular movement of said boom means about said first axis and said second axis, said aerodynamic means comprising air reaction control surfaces mounted on said boom means, and (e) third means for producing rotation of said boom means about a third axis, said third axis being orthogonal to said first axis and said second axis, whereby in use said third means aligns said chord plane with the local airflow flowing proximate said supply airplane.

18. The boom of claim 17, wherein said third means aligns said chord plane with said local airflow dependent upon the angular movement of said boom means about said first axis and said second axis.

19. The boom of claim 18, wherein said third means aligns said chord plane ith said local airflow in accordance with the following algorithm:

$$\Theta_r = \tan^{-1}(\sin\Theta_y/\cos\Theta_y \sin\Theta_p)$$

Where:

$\Theta_r$ = angular movement of said boom about said third axis $\Theta_y$ = angular movement of said boom about said first axis $\Theta_p$ = angular movement of said boom about said second axis.

20. The boom of claim 19, wherein said third means comprises a hydraulically powered helical rotary actuator.

* * * * *